United States Patent [19]

Bates et al.

[11] 4,365,779

[45] Dec. 28, 1982

[54] TILT AND ROTATE APPARATUS FOR A DISPLAY MONITOR

[75] Inventors: Bobbie D. Bates; Ralph A. Haus, both of Austin, Tex.

[73] Assignee: International Business Machines Corp., Armonk, N.Y.

[21] Appl. No.: 159,553

[22] Filed: Jun. 16, 1980

[51] Int. Cl.³ .................................. A47G 29/00
[52] U.S. Cl. ..................... 248/371; 248/179
[58] Field of Search ............. 248/371, 346, 349, 371, 248/397, 415, 418, 422, 425, 179, 181, 183, 133, 143, 139, 663, 678; D14/3

[56] References Cited

U.S. PATENT DOCUMENTS

| | | | |
|---|---|---|---|
| D. 244,205 | 5/1977 | Benham | D14/03 |
| D. 253,594 | 12/1979 | Antenbring | D14/02 |
| 2,029,089 | 1/1936 | Weiraugh | 248/223.2 |
| 3,817,393 | 6/1974 | Neilsen | 248/371 X |
| 3,851,607 | 12/1974 | August et al. | 248/678 |
| 3,970,792 | 7/1976 | Benham | 248/183 X |
| 3,974,994 | 8/1976 | Petterson | 248/663 |
| 4,019,710 | 4/1977 | O'Connor et al. | 248/181 |
| 4,068,961 | 1/1978 | Ebner et al. | 248/181 X |

FOREIGN PATENT DOCUMENTS 7909786  4/1979  Fed. Rep. of Germany .

*Primary Examiner*—J. Franklin Foss
*Attorney, Agent, or Firm*—James H. Barksdale, Jr.

[57] ABSTRACT

An apparatus for permitting, and limiting the extent of, tilting and rotating of a display monitor. The apparatus is made up of a top portion and a bottom portion. The top and bottom portions are connectable though a key and lock arrangement and have spherical mating contoured surfaces. The mating contoured surfaces permit the tilting and rotating of the monitor. Located on the bottom portion is a projection for engaging the top portion and limiting the extent of rotation of the monitor. The key and lock arrangement includes a lock in the bottom portion for cooperating with a key on the top portion to control the extent of tilting of the monitor. In addition, the top portion has outwardly and downwardly extending wings for limiting vibration of the monitor.

7 Claims, 5 Drawing Figures

TILT AND ROTATE APPARATUS FOR A DISPLAY MONITOR

DESCRIPTION

BACKGROUND OF THE INVENTION

1. Field of the Invention

This invention generally relates to display monitor positioning. More specifically, this invention relates to a tilt and rotate apparatus for connecting a display monitor to a base or stand.

2. Description of the Prior Art

Representative of known art related to this invention are U.S. Pat. Des. Nos. 244,205 and 253,594, and German utility application DGBM 79 09 786. Not disclosed or described in this art are features which would cause a limiting of the scope of the claims covering this invention. More specifically, a combination of vibration limiting wings, a key/lock arrangement for limiting tilt, and a rotation limiting protuberance and ribs, as set forth in the claims, is neither shown or suggested in any one or more of the above references. In Des. No. 244,205 there is simply shown a cylinder arrangement for permitting tilting of a display monitor. Des. 253,594 only discloses a ball and socket arrangement for permitting tilting and rotating of a monitor. A ball and socket arrangement is also disclosed in the German application and includes tilt limiting structure. In addition, a key/lock arrangement, which is a reverse version of that disclosed herein, is known in the prior art for limiting tilt in a cylinder monitor tilt mechanism.

The advantages of each of the above set out distinctive features of this invention are self-evident. Of importance though, is the ability to mount a display monitor on a stand or base without any positive engagement when in a non-tilted position.

The above, as well as other distinctions and advantages over the referenced art will be more fully appreciated when reference is made to the accompanying drawing and following description of the preferred embodiment.

SUMMARY OF THE INVENTION

An apparatus is provided for permitting, and limiting the extent of, tilting and rotating of a display monitor. The apparatus is made up of a top portion to be attached to the bottom of a monitor, and a bottom portion to be attached to the top of a monitor stand. The top and botton portions are connectable though a key and lock arrangement and have spherical mating contoured surfaces. The mating contoured surfaces permit the tilting and rotating of the monitor. Located on the contoured surface of the bottom portion is an upwardly projecting lug for engaging the top portion to limit the extent of rotation of the monitor. The key and lock arrangement includes a lock in the bottom portion of a size and shape to communicate with a key in the top portion to control the extent of tilting of the monitor. In addition, the top portion has outwardly and downwardly extending wings for communicating with the top of the botton portion for limiting vibration of the monitor.

DESCRIPTION OF THE PREFERRED EMBODIMENT

Figures 1, 2:
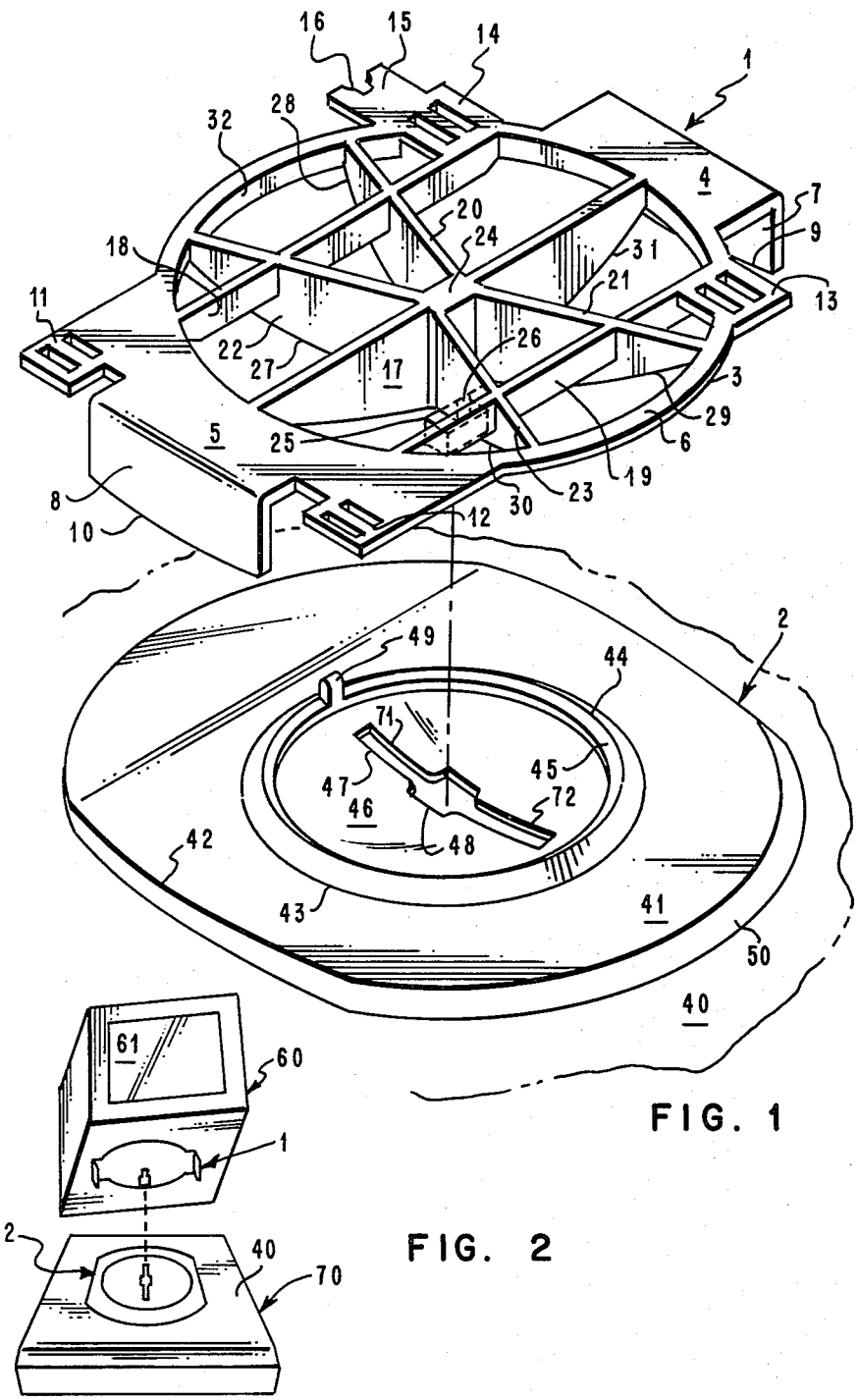
FIG. 1 is an exploded perspective view illustrating both a top portion and a bottom portion making up the apparatus of this invention.
FIG. 2 is a perspective view illustrating the concection of the top and bottom portions to a display monitor and a base, respectively.

For a detailed understanding of the invention, reference is first made to FIG. 1. In this figure there is shown the apparatus according to this invention for permitting, and limiting the extent of, tilting and rotating of a display monitor. The apparatus is made up of a top portion generally designated by reference numeral 1 and a bottom portion generally designated by reference numeral 2. Top portion 1 includes a ring 3 having a flat top 6 and an inside 32. Integral with inside 32 are a plurality of ribs 20, 21, 22, and 23. Ribs 20–23 are in turn integral with, and extend generally radially from, a central hub 24. Yet another rib 17 extends along a diameter of ring 3 and is integral with hub 24. Ribs 17 and 20–23 having lower surfaces 27, 28, 29, 30, and 31 which are arcuate in shape extending from ring 3 to hub 24. Surfaces 27–31 from a convex and generally spherically contoured surface which serves as a ball for mating with a socket in bottom portion 2. Rigidity is imparted to top portion 1 by ribs 18 and 19 which extend parallel to rib 17. Rib 18 is integral with ring 3 and ribs 20 and 22. Rib 19 is integral with ring 3 and ribs 21 and 23. The truss type structure thus described has a number of advantages. One is that significant weight is not added to the monitor. Another is that top portion 1 can be molded from an inexpensive polymeric material. Yet another is that, if vent openings are provided in the bottom of the monitor, heat dissipation is not restricted.

Extending outwardly and in the same plane as top 6 are wings 4 and 5 having downwardly extending projections 7 and 8. The lower surfaces 9 and 10 of projections 7 and 8, respectively, are arcuate in shape and will be described further later herein. Also located in the same plane as top 6 are locating and vent tabs 11, 12, 13, and 14. Tabs 11–14 have openings for communicating with matching openings in the bottom of the display monitor for permitting the dissipation of heat. Also, tabs 11 and 12 have notches adjacent wing 5 for communicating with lugs (not shown) on the bottom of the monitor for aiding in properly locating top portion 1. In addition, tab 14 has an extension 15 with a locating cutout 16 which further aids in properly locating and mounting top portion 1 on the bottom of the display monitor.

Extending downwardly from hub 24, and integral therewith, is a T-shaped key made up of a leg 26 and a foot 25. The T-shaped key, made up of leg 26 and foot 25 15 is for communicating with a lock slot 47 in bottom portion 2. Lock 47 has an enlarged central portion 48 for permitting passage therethrough of foot 25 in any rotational position of top portion 1. Lock 47 has radial extensions 71 and 72 of reduced width extending from enlarged portion 48. The width of extensions 71 and 72 is sufficient to permit leg 26 to be freely slidable therein, yet narrow enough to pervent the passage therethrough of foot 25.

Lock 47 is located in the bottom of a concavity or crafter 46 having a raised lip 44 with a beveled surface 45. The beveled surface 45 can be generally spherically contoured to matingly accept the spherically contoured surface formed by ribs 17 and 20-23 of top portion 1. Thus, surface 45 serves as a socket for top portion 1. Lip 44 is integrally connected at 43 to a plate 41 having a circumferential extremity 42 sufficiently large to be contacted by lower surfaces 9 and 10 for any desired extent or rotation of the monitor. Also, extremity 42 is sufficiently large to be connected by lower surfaces 9 and 10 for any degree of outward or horizontal extension of wings 4 and 5. Wings 4 and 5 must extend outwardly a sufficient distance to limit vibration should the monitor be disturbed through "bumping", etc. In order that foot 25 not interfere with top 40 of a monitor stand or base, plate 41 is elevated by a footing 50 which is integral with plate 41.

Extending or projecting upwardly from lip 44 is a projection 49 for engaging the facing surfaces of ribs 20 and 22 for limiting the degree of rotation of top portion 1.

For an understanding of the apparatus relative to the display monitor and a stand or base, reference is made to FIG. 2. In this figure is shown display monitor 60 having top portion 1 connected to the bottom thereof. Display monitor 60 includes a screen 61. A base 70 is provided for bottom portion 2 which is mounted on top 40. With top portion 1 connected to the bottom of display monitor 60 such that the center of gravity of display monitor 60 extends through leg 26 and foot 25, very little operator effort is required to position display monitor 60 for convenient viewing of screen 61.

In the embodiment illustrated, bottom portion 2 is to be bonded by suitable means to top 40 of base 70. As a preferred alternative, bottom portion 2 will be molded, and be integral with top 40. A preferred alternative to a separate top portion 1 is to have ribs 17-23, the lower portion of ring 3, and downwardly extending projections 8 and 9 of wings 4 and 5 molded into the bottom of monitor 60. The remainder of top portion 1 would then simply form part of the bottom of monitor 60.

Figure 3:
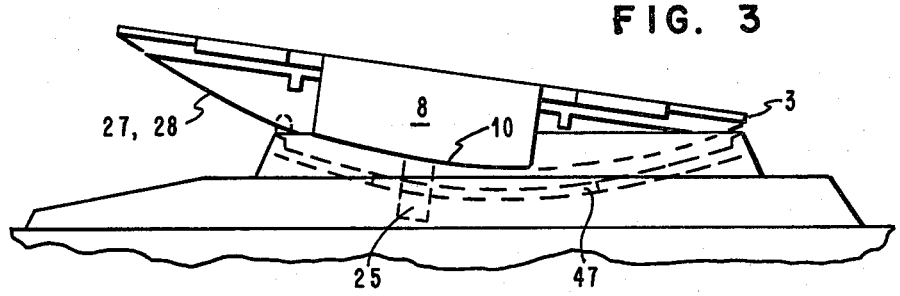
FIG. 3 is a side view illustrating the relationship of the top and bottom portions when the display monitor is in a tilted down position.
Figure 4:
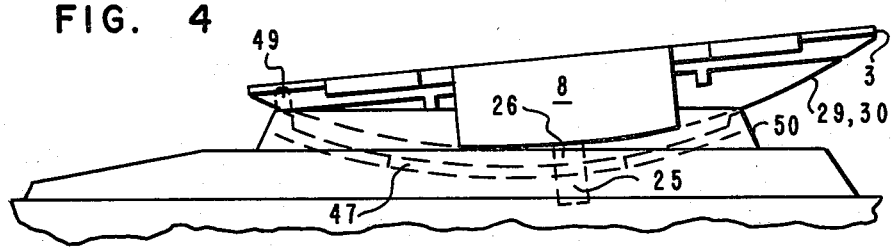
FIG. 4 is a side view illustrating the relationship of the top and bottom portions when the display monitor is in a tilted up position.

Referring next to FIGS. 3 and 4, there is shown the relationship of top portion 1 and bottom portion 2 with display monitor 60 tilted in up and down positions. Illustrated in FIG. 3 are arcuate surfaces 27 and 28, porjection 8 of wing 5, foot 25, ring 3, and extension 47. In FIG. 4, illustrated and projection 49, extension 47, leg 26, foot 25, projection 8, bevel 50, surfaces 29 and 30, and ring 3. It is noted in both FIGS. 3 and 4 that leg 26 extends through lock 47 with foot 25 being below the bottom of crater 46. The lower surface 10 of wing 8 is arcuate to permit the tilting of display monitor 60 and maintain contact with plate 41.

As shown, projection 49, upon an upward tilt of monitor 60, will engage inside 32 of ring 3 and limit the extent of tilt. As an alternative and preferred alternative embodiment, projection 49 will be located within crater 46. This will permit tilting in either direction to the extent of the outer ends of extensions 71 and 72. The outer ends of extensions 71 and 72 are abutted by leg 26, limiting any further tilting of monitor 60.

Figure 5:
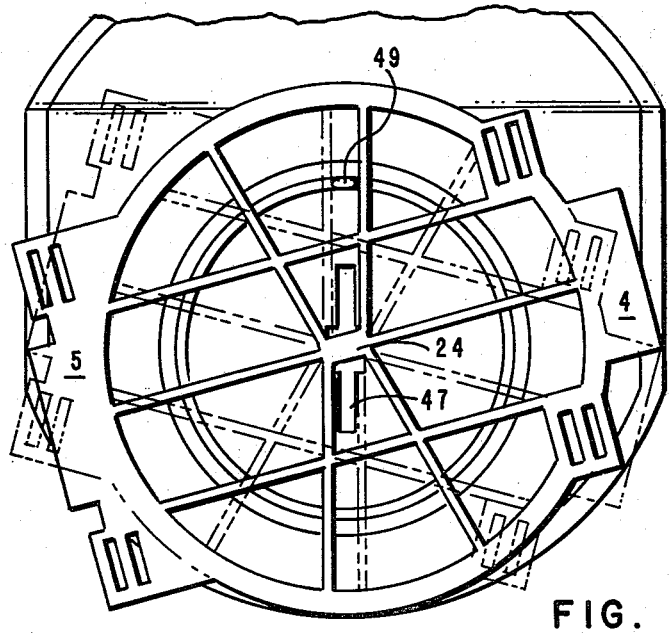
FIG. 5 is the top view of the apparatus of this invention illustrating the relationship of the top and bottom portions where the display monitor is in right and left rotated positions.

Referring to FIG. 5, there is shown, in solid lines, the relationship with the top portion 1 and bottom portion 2 upon rotation of display monitor 60 to the right. The extent of right rotation is limited by projection 49 upon engagement with rib 20. When display monitor 60 is rotated to the left, as shown in dashed lines, projection 49 is engaged by rib 22.

In summary, an apparatus is provided for permitting, and limiting the extent of, tilting and rotating of a display monitor. The apparatus is made up of a top portion to be attached to the bottom of a monitor, and a bottom portion to be attached to the top of a monitor stand. The top and bottom portions are connectable though a key and lock arrangement and have spherical mating contoured surfaces. The mating contoured surfaces permit the tilting and rotating of the monitor. Located on the contoured surface of the bottom portion is an upwardly lug for engaging the top portion to limit the extent of rotation of the monitor. The key and lock arrangement includes a lock in the bottom portion of a size and shape to communicate with a key in the top portion to control the extent of tilting of the monitor. In addition, the top portion has outwardly and downwardly extending wings for communicating with the top of the bottom portion for limiting vibration of the monitor.

While the invention has been particulary shown and described with reference to a particular embodiment, it will be understood by those skilled in the art that various changes in form and detail may be made without departing from the spirit and scope of the invention.

What is claimed is:

1. An apparatus for permitting, and limiting the extent of, tilting and rotating of a display monitor, said apparatus comprising in combination:
   (a) a top portion having a spherically contoured surface, a key means extending from said surface, and wings
      (1) adjacent said surface,
      (2) extending outwardly and downwardly from said surface a sufficient extent to limit vibration of said monitor, and
      (3) having bottom surfaces which are arcuate in shape and have a curvature matching that of said contoured surface of said top portion; and
   (b) a bottom portion having
      (1) a contoured surface for mating with said contoured surface of said top portion and having an annular lip,
      (2) a lock adapted to be engaged by said key for limiting the extent of tilting of said monitor,
      (3) means extending from said bottom portion for engaging said top portion and limiting the extent of rotation of said monitor, and
      (4) a plate extending circumferentially from said annular lip, and being of a sufficient size to be contacted by said arcuate shaped bottom surfaces during tilting and rotating of said monitor to limit vibration of said monitor for the extent of rotation of said monitor when said top and bottom portions are connected.

2. An apparatus according to claim 1 wherein said surface of said top portion is convex.

3. An apparatus according to claim 2 wherein said surface of said bottom portion is concave.

4. An apparatus according to claim 1 wherein said top portion is structured from a plurality of generally radially extending ribs having arcuate bottom surfaces forming said spherically contoured surface.

5. An apparatus accrording to claim 4 wherein said key and said lock are structured to be in locking engagement when said monitor is tilted.

6. An apparatus according to claim 5 wherein said lock is structured to limit the extent of tilting of said monitor.

7. An apparatus according to claim 6 wherein said lock and said key are structured to be in non-locking engagement when said monitor is not in a tilted position.

* * * * *